Patented Feb. 16, 1943

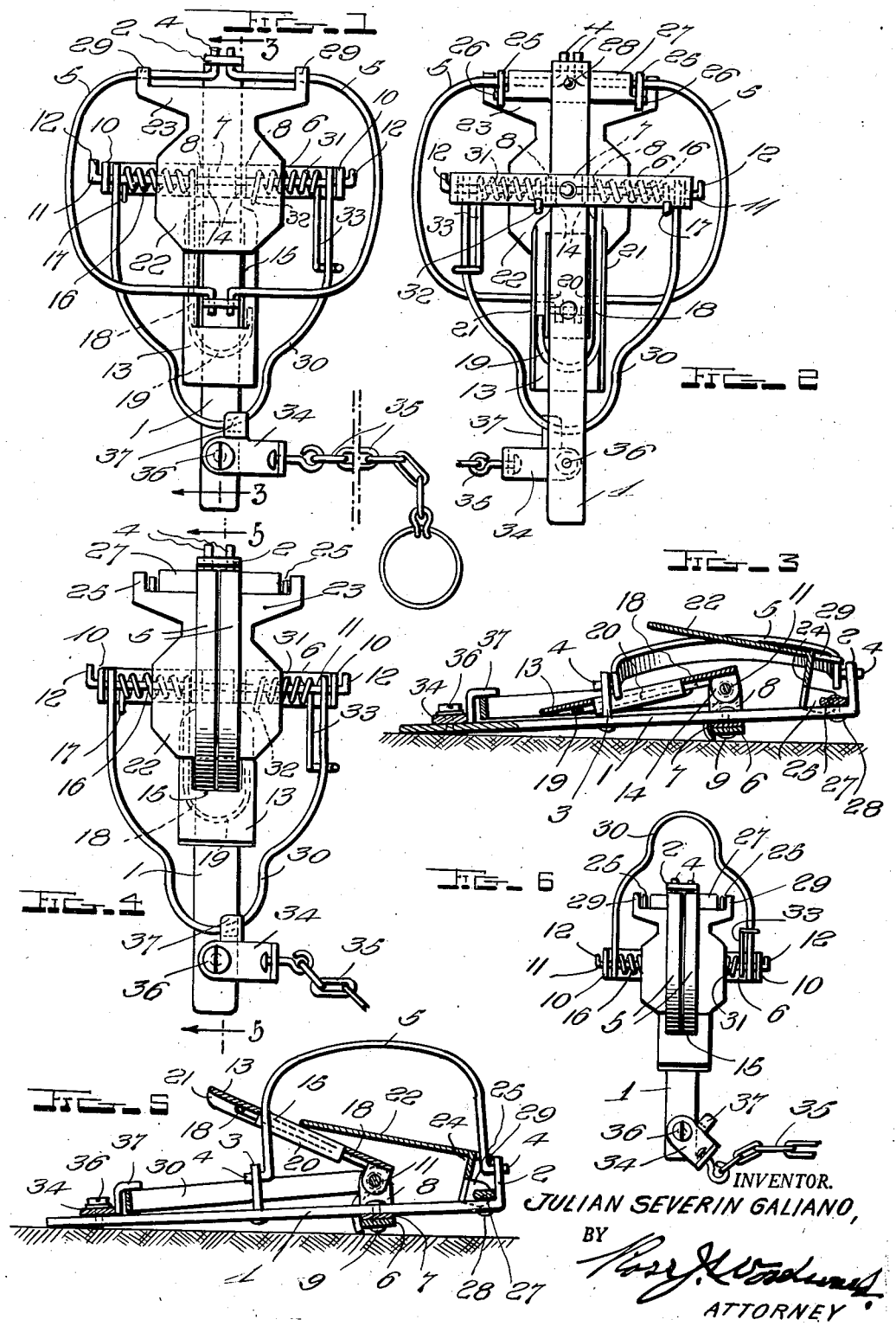

2,311,378

UNITED STATES PATENT OFFICE 2,311,378

TRAP

Julian S. Galiano, Cut Off, La., assignor of forty per cent to Harry G. Simoneaux, Golden Meadow, La.

Application October 22, 1941, Serial No. 416,115

2 Claims. (Cl. 43—88)

This invention relates to traps and more particularly to a trap of the spring jaw type used for catching muskrats and other fur bearing animals, it being understood that the improved trap may be used for catching any animal for which its size adapts it.

When a spring jaw trap is being set, it often happens that the latch for holding the jaws open will slip and the jaws snap closed, and a person's hand or fingers become caught between the jaws and broken or, at least, painfully injured. Therefore, one object of the present invention is to provide a spring jaw trap having a combined latch and trip pan so formed that the jaws may be moved to open position and secured without danger of a person's hand or fingers being caught between the jaws in the event the latch does not have firm engagement with the jaws when the trap is set.

Another object of the invention is to so form the combined latch and trip plate that portions thereof may have overlapping engagement with the jaws and firmly hold them open when the trap is set.

Another object of the invention is to provide the trap with a jaw-opening member or lever which is so mounted that the lever may be moved in a jaw-opening direction with one hand and the jaws held open with the one hand while tilting the trap to a position for moving the latch into position for overlapping engagement with the jaws.

It has been found that when muskrats and other fur bearing animals are caught in traps, they will often twist or knaw a caught foot or leg off in order to escape and it is, therefore, another object of the invention to provide the trap with a spring actuated striker which is releasably held in set position when the trap is set and released when an animal is caught, the striker, when released, having movement across the closed jaws in a direction to strike the caught animal and either kill it or bind it against the closed jaws in position to prevent escape.

Another object of the invention is to provide a trap wherein the striker for killing or clamping the trapped animal is releasably held in set position by a plate to which the securing chain for the trap is attached, the plate being pivotally mounted so that when pull is exerted on the trap by an animal caught therein, the plate will be turned to a position for releasing the striker.

Another object of the invention is to provide a spring jaw trap which is simple in construction, efficient in operation, and not liable to become broken through rough or careless handling.

The invention is illustrated in the accompanying drawing, wherein:

Fig. 1 is a top plan view of the improved trap when set.

Fig. 2 is a bottom plan view thereof.

Fig. 3 is a sectional view on the line 3—3 of Fig. 1.

Fig. 4 is a top plan view showing the jaws closed and the striker still held in set position.

Fig. 5 is a sectional view on the line 5—5 of Fig. 4.

Fig. 6 is a top plan view showing the jaws closed and the striker released and in its normal position.

The base 1 of the trap is in the form of a metal bar of suitable length and width, the front end of the base bar being bent upwardly to form an ear or bearing bracket 2 and a second bearing bracket or ear 3 is riveted to the base bar in such spaced relation to the front ear 2 that pintles 4 of the jaws 5 may be engaged through openings in the ears and pivotally mount the jaws for swinging movement from the open position shown in Fig. 1, to the closed position illustrated in Fig. 4.

A cross bar or yoke 6 extends transversely of the base bar and midway its length carries a bracket 7 having upstanding arms 8 which bear against opposite side edges of the base bar. The cross bar and bracket are firmly secured to the base bar by a rivet 9 and end portions of the cross bar are bent upwardly to form arms 10. The arms 8 and 10 serve to mount a rod 11 which has its end portions bent, as shown at 12, to hold the rod in place and between the ears of the bracket 7 the rod carries a lever 13 formed of stiff metal and having depending hinge ears 14 at its front end through which the rod or pin 11 passes to pivotally mount the lever. An opening 15 is formed through the lever to receive the rear arms of the jaws 5 and, in order that the lever will be urged upwardly and yieldably held in raised position to hold the jaws closed, there has been provided a helical spring 16 which is coiled about the rod and has a finger 17 at its outer end which bears against the cross bar 6 and an elongated finger or arm 18 at its inner end which bears against the under surface of the lever. This arm 18 has a curved or U-shaped free end portion 19 providing pressure against a large area of the lever, and the lever has inner and outer depending flanges 20 and 21 which hold the spring in proper engagement with the lever and prevent displacement of the spring arm from the lever.

The spring normally holds the lever raised with the jaws closed and, when the lever is depressed, the jaws may swing downwardly to open position. Upon release of the lever, the spring will swing it rapidly to a raised position and the jaws will be closed and held in gripping engagement with the foot or other portion of an animal caught in the trap. The free rear end portion of the lever projects rearwardly from the jaws and by holding the trap in one hand with the fingers engaging under the base bar 1, and the thumb pressing upon the rear end portion of the lever, the lever may be depressed and the jaws allowed to swing to open position without the fingers of either hand being in a position to be caught between the jaws in the event the lever should slip out of engagement with the thumb.

In order that the jaws may be releasably held in open position, there has been provided a combined trip plate and latch. This plate 22 extends longitudinally of the trap with its rear portion over the forward portion of the lever. At its front end, the plate is widened to form a cross head 23 carrying a depending flange 24, from lower corner portions of which extend forwardly projecting ears 25. These ears 25 are perforated to receive pintles 26 which project from the opposite ends of a bearing bar 27 secured upon the front end of the base bar 1 by a rivet 28 and the trip plate will thus be pivotally mounted for vertical tilting movement from the raised position shown in Fig. 3, to a lowered or depressed position. Fingers 29 project forwardly from the cross head 23 at opposite sides of the top of the flange 24 and when the lever is depressed and the jaws swung downwardly to open position, the trip plate may then be swung upwardly to dispose the fingers over the jaws and frictionally grip the same to hold the jaws open when pressure upon the lever is released sufficiently to move the jaws into binding engagement with under faces of the fingers. Upward tilting of the plate, after opening of the jaws, may be accomplished with a finger of one one hand while the other hand holds the trap and depresses the lever, but it is preferably accomplished by tilting the trap forwardly a sufficient distance to cause the fingers to move into position over the jaws. It will thus be seen that the trap may be held and set with one hand, the fingers and thumb of this hand being back of the jaws, and there will be no danger of a person being injured by accidental closing of the jaws while attempting to set the trap. When an animal steps upon the trip pan of the set trap it will be depressed and the jaws will be rapidly swung upwardly to closed position by action of the spring and the lever, and the jaws will be held in gripping engagement with the foot or leg of the animal.

When an animal is so caught, it often happens that, in attempting to escape, the leg will be broken and twisted until it is torn free from the trap. It also often happens that an animal caught in a spring jaw trap will gnaw the caught foot or leg off and escape. To prevent this, this trap has been provided with a striker 30 which is formed of stiff metal. This striker is substantially U-shaped and has its arms pivoted on the rod or pin 11 in close proximity to the ears 10 of the cross bar 6. The striker is of such length that it may have swinging movement over the jaws from the set position shown in Figs. 1 through 5 of the drawing, to the normal position shown in Fig. 6, and in order that the striker may be urged forwardly and normally held in forwardly projecting position, there has been provided a helical spring 31 which is coiled about the rod 11 at the opposite side of the lever from the spring 16 and has a finger 32 at its inner end for engaging the cross bar 6 and a longer finger 33 at its outer end for engaging the adjacent arm of the striker. When the striker is swung rearwardly to the set position, the spring is wound in a tensioning direction and has a tendency to swing the striker forwardly. A plate 34 to which a chain 35 is attached, is pivoted to the rear end portion of the base bar 1 by a fastener 36 and carries a tongue or bill 37 for overlapping the normally free end of the striker and holding the striker in set position. The anchor plate 34 must be turned to a position in which it extends transversely of the base bar in order that the tongue or bill may overlap the striker and it will be readily understood that when an animal is caught and drags the trap in its endeavors to escape, pull exerted will cause the anchor plate to move toward a position in which it extends longitudinally of the base bar and the bill or latch 37 will be moved out of overlapping engagement with the striker. The striker will thus be released and the spring 31 will swing it forwardly over the closed jaws toward the normal position shown in Fig. 6, and, as the striker moves forwardly, it will strike the caught animal and either kill it or clamp it against the jaws in such position that it cannot twist its foot loose or gnaw through a caught foot or leg and escape.

I have, therefore, devised a spring jaw trap so constructed that it may be easily set without danger of a person's hand being caught between the jaws during the setting operation and, in addition, provided the trap with an auxiliary jaw or striker so mounted that it may be secured in a set position by the anchor plate to which the chain is attached and released when pull is exerted by an animal endeavoring to escape from the trap after being caught between the jaws thereof.

Having thus described the invention, what is claimed is:

1. A trap comprising a base, a cross bar carried by the base and extending transversely thereof in spaced relation to the front end of the base, jaws pivoted to the base for swinging movement transversely thereof from open position upwardly to closed position, a rod carried by the cross bar and extending across the base, a lever pivoted at its front end to said rod over the base and extending longitudinally of the base and having a portion for engaging the jaws and swinging the jaws upwardly to closed position, a spring carried by the rod urging the lever upwardly, a bearing bar extending across the front end of the base under the front ends of the jaws, a trip plate over the base extending longitudinally thereof and having a depending flange at its front end provided with forwardly extending ears pivoted to ends of the bearing bar and mounting the trip plate for vertical tilting movement, and fingers extending forwardly from opposite sides of the trip plate at the ends of its flange for engaging over forward portions of the front ends of the depressed jaws and releasably holding said jaws open.

2. A trap comprising a base, a cross bar extending under the base transversely thereof in spaced relation to the front end of the base and having upstanding ears at its ends, a bracket mounted under the base and having upstanding ears at opposite sides of the base, jaws pivoted to the base for swinging movement transversely thereof from open position upwardly to closed position, a rod carried by the ears of the cross bar and extending through the ears of the bracket and across the base, a lever pivoted at its forward end to said rod between the ears of the bracket and extending longitudinally of the base and engaging the jaws for swinging the jaws upwardly to closed position, the free rear end of the lever constituting a finger hold for swinging the lever downwardly out of engagement with the jaws, a spring about said rod at one side of the lever having its inner end portion engaging under the lever and urging said lever upwardly to close the jaws, a trip plate pivoted at its front end to the base and extending rearwardly with its free end overlying the forward portion of the lever, said trip plate having fingers for engaging over forward portions of the depressed jaws and releasably holding the jaws open, a U-shaped striker having the ends of its arms pivoted to said rod at opposite ends of the cross bar to mount the striker for swinging movement longitudinally of the base over the lever and closed jaws from a set position rearwardly of the jaws to a normal position forwardly of the jaws and the front end of the base, a spring about said rod at the opposite side of the lever from the first spring having its outer end portion engaging the striker and urging the striker forwardly, and a chain-carrying anchor plate carried by the rear portion of the base for movement by a pull upon the trap from a position in engagement with the rear end of the striker to a position releasing the striker and allowing the striker to be swung forwardly by its spring.

JULIAN S. GALIANO.